United States Patent
Iwamatsu (10) Patent No.: US 8,732,721 B2
(45) Date of Patent: May 20, 2014

(54) METHOD FOR REDUCING TRAP OVERHEAD WHEN EXECUTING A GUEST IN A VIRTUAL MACHINE

(75) Inventor: Yosuke Iwamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 1041 days.

(21) Appl. No.: 12/391,601

(22) Filed: Feb. 24, 2009

(65) Prior Publication Data

US 2009/0217014 A1    Aug. 27, 2009

(30) Foreign Application Priority Data

Feb. 27, 2008    (JP) .................................. 45585/2008

(51) Int. Cl.
*G06F 9/455* (2006.01)
*G06F 9/46* (2006.01)

(52) U.S. Cl.
USPC .............................................. 718/108; 718/1

(58) Field of Classification Search
None
See application file for complete search history.

(56) References Cited

U.S. PATENT DOCUMENTS

| 5,488,716 A * | 1/1996 | Schneider et al. ............... 714/10 |
| 7,191,440 B2 * | 3/2007 | Cota-Robles et al. ............ 718/1 |
| 2005/0223377 A1 * | 10/2005 | Galal et al. ........................ 718/1 |

FOREIGN PATENT DOCUMENTS

| JP | 2005122711 A | 5/2005 |
| JP | 2007035045 A | 2/2007 |
| WO | 2007005819 A1 | 1/2007 |

OTHER PUBLICATIONS

Japanese Office Action for JP2008-045585 issued Feb. 24, 2010.

* cited by examiner

*Primary Examiner* — Corey S Faherty
(74) *Attorney, Agent, or Firm* — Sughrue Mion, PLLC (57) ABSTRACT

A processor includes a VM trap logic and a buffering logic. The VM trap logic determines whether or not an instruction acquired from a VM (Virtual Machine) satisfies a predetermined VM trap condition. The buffering logic determines whether or not the instruction acquired from the VM satisfies a predetermined buffering condition.

14 Claims, 6 Drawing Sheets

METHOD FOR REDUCING TRAP OVERHEAD WHEN EXECUTING A GUEST IN A VIRTUAL MACHINE

RELATED APPLICATIONS

This application is based on Japanese Patent Application No. JP 2008-045585 filed on Feb. 27, 2008, and including a specification, claims, drawings and summary. The disclosure of the above Japanese Patent Application is incorporated herein by reference in its entirety.

TECHNICAL FIELD

The present invention relates to a processor, a memory device, a processing device, and a method for processing an instruction.

BACKGROUND ART

A virtual machine monitor (hereinafter, it is referred to as "VMM") operates on a platform hardware, and on which one or more virtual machines (hereinafter, it is referred to as "VM") can be executed. The virtual machine is a logical platform created by software, and can execute a guest operating system and a guest application (hereinafter, these are referred to as "guest" or "guest VM").

In a virtual machine technology, there are two virtualization methods, one is "emulation" and another is "direct execution". In the emulation, a guest's instruction is executed while performing a sequential conversion of it or the guest's instruction is converted into a binary code in advance and it is executed. In the direct execution, the guest's instruction is directly executed on a processor. In the direct execution, the guest's instruction may be executed in a privileged mode that is lower than the VMM, and with respect to a sensitive instruction for sensing or changing a state of a system resource, or an operation mode, the VMM traps the instruction and emulates the state changes. Generally, an execution speed of the direct execution is higher than that of the emulation.

By the way, an overhead of an instruction to execute a trap and change a mode is larger than that of a usual instruction. For example, in case of Pentium (registered trademark) 4 processor which supports Intel Virtualization Technology advocated by Intel Corporation, a VM-Entry instruction to transfer a control to the VM from the VMM and a VM-Exit instruction to transfer a control to the VMM from the VM need about two thousand cycles. Therefore, in the direct execution, when the trap of the instruction and the change of the privileged mode occur frequently, the overhead is increased and a performance of the processor is deteriorated.

As one solution to the problem of the performance deterioration caused by the trapping and the mode change, a method with which the sensitive instruction of a guest operating system is rewritten as an instruction with which the trap is not generated can be used. There are two rewrite methods, one is a method with which the rewrite is performed statically and another is a method with which the rewrite is performed dynamically at the time of execution. However, when the method with which the instruction is rewritten statically is used, it is necessary to correct a source code or a binary code in advance. On the other hand, when the method with which the instruction is rewritten dynamically is used, a new additional process is required with the execution of the rewrite and a problem occurs in which the performance is degraded.

As another solution to the problem of the performance deterioration caused by the trapping and the mode change, Japanese Patent Application Laid-Open No. 2005-122711 discloses a technology with which a privileged instruction (instruction that needs a privileged mode) issued by the guest is trapped by the VMM, the synthetic instruction is generated sequentially to suppress an occurrence of a privilege violation, the change to the privileged mode is executed with the synthetic instruction and accordingly, a bad influence to virtualization is suppressed.

Japanese Patent Application Laid-Open No. 2007-35045 discloses a technology with which a processor device defines a virtual machine control structure (VMCS) for an execution environment of the VM and executes a change between the VM and the VMM according to the information on the VMCS.

However, in the technologies disclosed by Japanese Patent Application Laid-Open No. 2005-122711 and Japanese Patent Application Laid-Open No. 2007-35045, when the sensitive instruction that depends on a state of a system resource or an operation mode is executed during the execution of the VM, a control is transferred to the VMM from the VM ultimately. Namely, by using the technologies disclosed by the above-mentioned official bulletins, a number of times at which the control is transferred to the VMM from the VM can not be reduced. Therefore, a processing efficiency of a processor cannot be improved.

SUMMARY

An exemplary object of the present invention is to provide a processor in which number of times at which a control is transferred to the VMM from the VM is reduced and a performance is improved, a memory device, a processing device, and a method for processing an instruction.

According to an exemplary aspect of the invention, a processor includes a VM trap logic and a buffering logic. The VM trap logic determines whether or not an instruction acquired from a VM (Virtual Machine) satisfies a predetermined VM trap condition. The buffering logic determines whether or not the instruction acquired from the VM satisfies a predetermined buffering condition.

According to another exemplary aspect of the invention, a memory device includes a buffer structure at least having a buffering condition that is a condition to determine whether or not to buffer an instruction from a VM.

According to another exemplary aspect of the invention, a processing device includes a processor and a memory device. The processor includes a VM trap logic and a buffering logic. The VM trap logic determines whether or not an instruction acquired from a VM satisfies a predetermined VM trap condition. The buffering logic determines whether or not the instruction acquired from the VM satisfies a predetermined buffering condition. The memory device includes a buffer structure at least having a buffering condition that is a condition to determine whether or not to buffer an instruction from a VM.

According to another exemplary aspect of the invention, a method for processing an instruction includes acquiring an instruction from a VM, determining whether or not said acquired instruction satisfies a predetermined VM trap condition, and determining whether or not said acquired instruction satisfies a predetermined buffering condition.

According to another exemplary aspect of the invention, a processor includes a first determination means and a second determination means. The first determination means is determining whether or not an instruction acquired from a VM (Virtual Machine) satisfies a predetermined VM trap condition. The second determination means is determining whether or not the instruction acquired from the VM satisfies a predetermined buffering condition.

BRIEF DESCRIPTION OF THE DRAWINGS

Exemplary features and advantages of the present invention will become apparent from the following detailed description when taken with the accompanying drawings in which.

EXEMPLARY EMBODIMENTS

Figure 1:
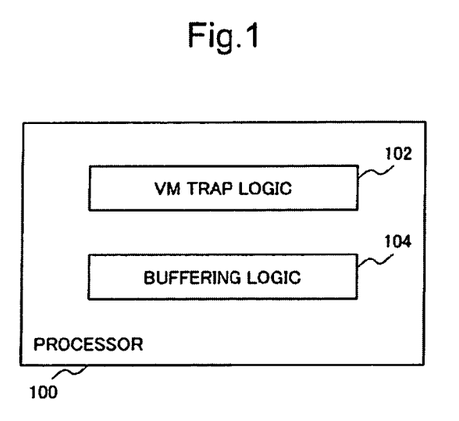
FIG. 1 is a configuration diagram showing an example of a configuration of a processor according to a first exemplary embodiment of the present invention.

FIG. 1 is a configuration diagram showing an example of a configuration of a processor according to a first exemplary embodiment of the present invention. A processor 100 includes a VM (Virtual Machine) trap logic 102 and a buffering logic 104. The VM trap logic 102 determines whether or not an instruction acquired from a VM satisfies a predetermined VM trap condition. The buffering logic 104 determines whether or not the instruction acquired from the VM satisfies a predetermined buffering condition.

In the above configuration, the buffering logic 104 decides, on the basis of the predetermined buffering condition, either to execute an exit or to buffer (store) the instruction before executing the exit of the VM, when the instruction (for example, a guest instruction) is determined by the VM trap logic 102 because it satisfies the VM trap condition. The buffering logic 104 buffers the instruction if needed.

Namely, because at least A part of instructions for control is buffered in the processor 100 mentioned above, a number of times at which the control is transferred to the VMM (Virtual Machine Monitor) from the VM can be reduced. Therefore, a processing overhead used for a process by which the control is transferred to the VMM from the VM can be reduced and a processing performance of a system can be improved.

Figure 2:
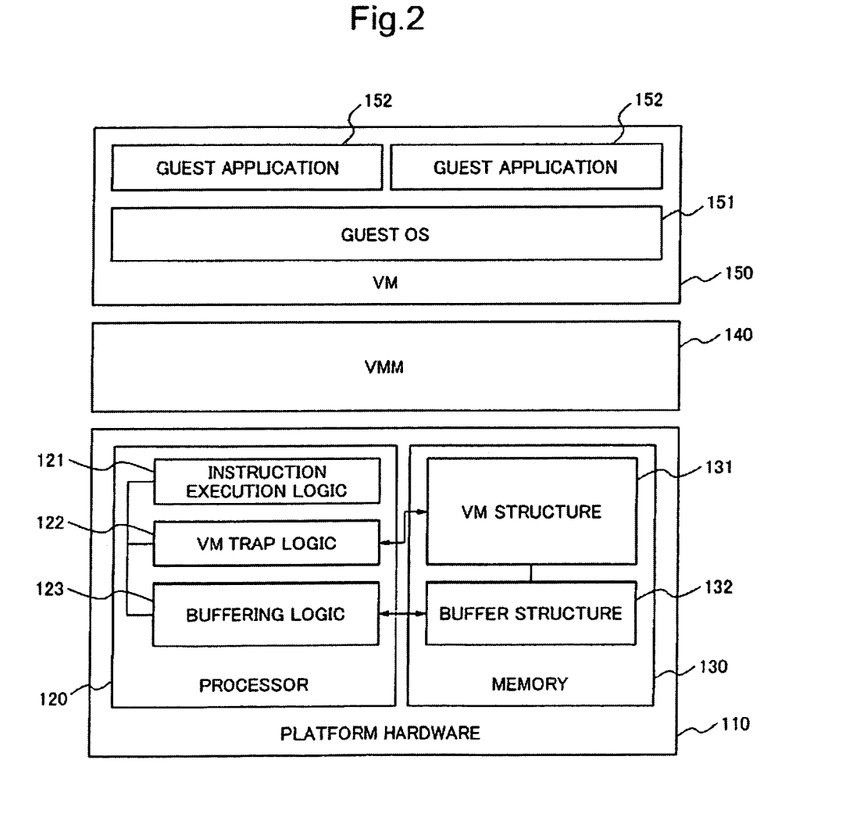
FIG. 2 is a figure showing an example of a virtualization architecture of an exemplary embodiment of the present invention.

FIG. 2 is a figure showing an example of a virtualization architecture of an exemplary embodiment of the present invention. The virtualization architecture of the exemplary embodiment is configured with a platform hardware 110, a VMM 140, and a VM 150 which operates on the VMM.

The platform hardware 110 includes a processor 120 and a memory 130. The processor 120 includes an instruction execution logic 121, a VM trap logic 122 and a buffering logic 123. The instruction execution logic 121 is a logic for executing the instruction. The VM trap logic 122 is a logic which receives the guest instruction that is the instruction from the VM, and executes a determination of a trap and an exit from a VM environment. The buffering logic 123 is a logic which determines whether or not to buffer the guest instruction for which it is determined that the trap is executed by the VM trap logic 122. The buffering logic 123 stores the guest instruction in a buffer. Further, the above mentioned "logic" can be realized by a programmable logic that uses a microcode or a program or by a hard code logic.

The VMM 140 makes the VM 150 executable by using hardware resources (processor 120 and memory 130). The VM 150 provides an environment in which a virtual OS (Operating System) can operate. A guest OS 151 and a guest application 152 operate on the VM 150.

Figure 3:
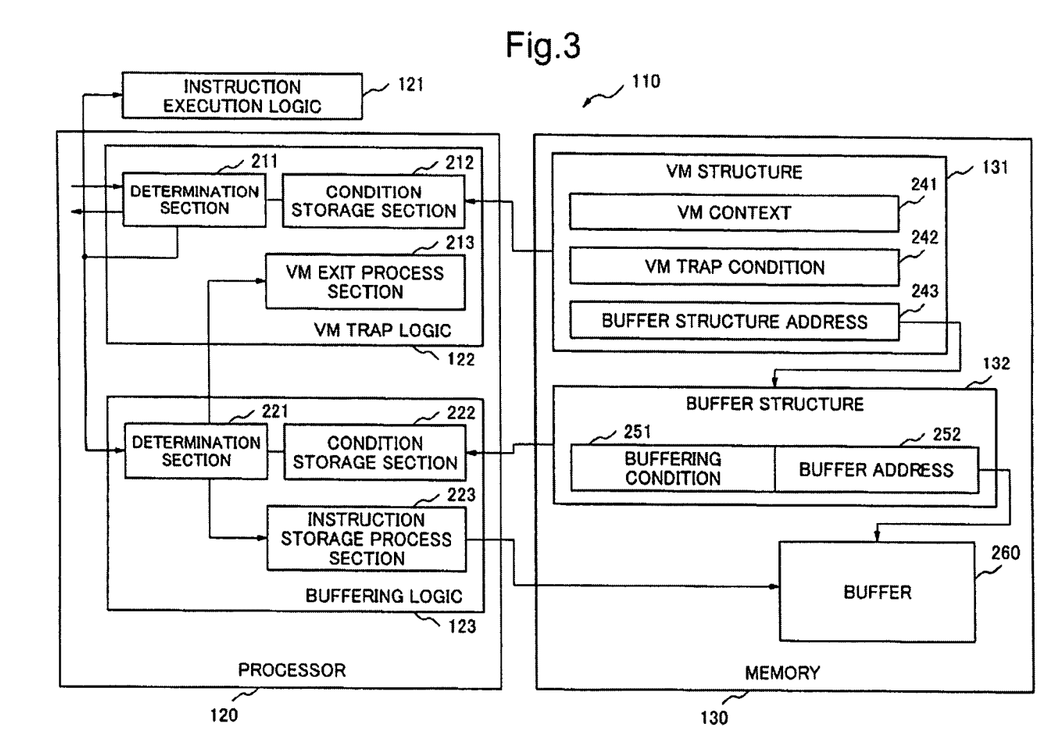
FIG. 3 is a detailed configuration diagram showing an example of a detailed configuration of a platform hardware according to a second exemplary embodiment of the present invention.

FIG. 3 is a detailed configuration diagram showing an example of a detailed configuration of a platform hardware 110 according to a second exemplary embodiment of the present invention.

The VM trap logic 122 includes a determination section 211, a condition storage section 212 and a VM exit process section 213.

The determination section 211 determines whether or not to trap the guest instruction. The condition storage section 212 stores a content of a VM structure 131 read from the memory 130. When it is determined by the determination section 211 that the guest instruction is an instruction to be trapped, the VM exit process section 213 executes an exit process from the VM environment.

The buffering logic 123 includes a determination section 221, a condition storage section 222 and an instruction storage process section 223.

The determination section 221 receives the guest instruction for which it is determined that it is the instruction to be trapped by the VM trap logic 122 and determines whether or not to execute the buffering. The condition storage section 222 stores the content of a buffer structure 132 read from the memory 130. The instruction storage process section 223 stores the instruction for which it is determined that it is the instruction to be buffered in the buffer. Further, the instruction to which the buffering can be executed is, for example, the instruction not required for an immediate execution, such as a write instruction to an I/O (Input/Output) device.

The memory 130 includes the VM structure 131, the buffer structure 132 and a buffer 260.

The VM structure 131 is a structure on a memory which includes at least a VM context 241, a VM trap condition 242 and a buffer structure address 243. The VM context 241 is a data structure which indicates a state of the VM 150 and stores a value of a register and a state of another CPU (Central Processing Unit). The VM trap condition 242 is a data structure indicating a condition to decide either to directly execute or to trap, when the guest instruction is executed under the VM environment. Further, as the condition, type of instruction, a register, an address range and the like are set. The buffer structure address 243 is a data structure in which a memory address and a range of a buffer related to the VM structure 131 are recorded. Further, there are many VM structures 131 corresponding to number of the VMs 150 which operate on the VMM 140 or number of the virtual CPUs.

The buffer structure 132 is a structure with a set of a buffering condition 251 and a buffer address 252. A plurality of sets of the condition and the address may exist in one buffer structure. The buffering condition 251 is a data structure indicating a condition to decide either to execute a buffering and maintain the VM environment or to execute the exit from the VM environment when the guest instruction is executed in the VM environment and the trap is executed. Further, as the condition, type of instruction, a register, an address range and the like are set. The buffer address 252 is a data structure in which a memory address and a range of the buffer 260 for storing the instruction are recorded.

The buffer 260 is a memory area for storing the instruction which satisfies the buffering condition. A record stored in the memory area includes an instruction, an operand, a value of a register and an address accessed by the instruction, a reason of an error, and the like.

Figure 4:
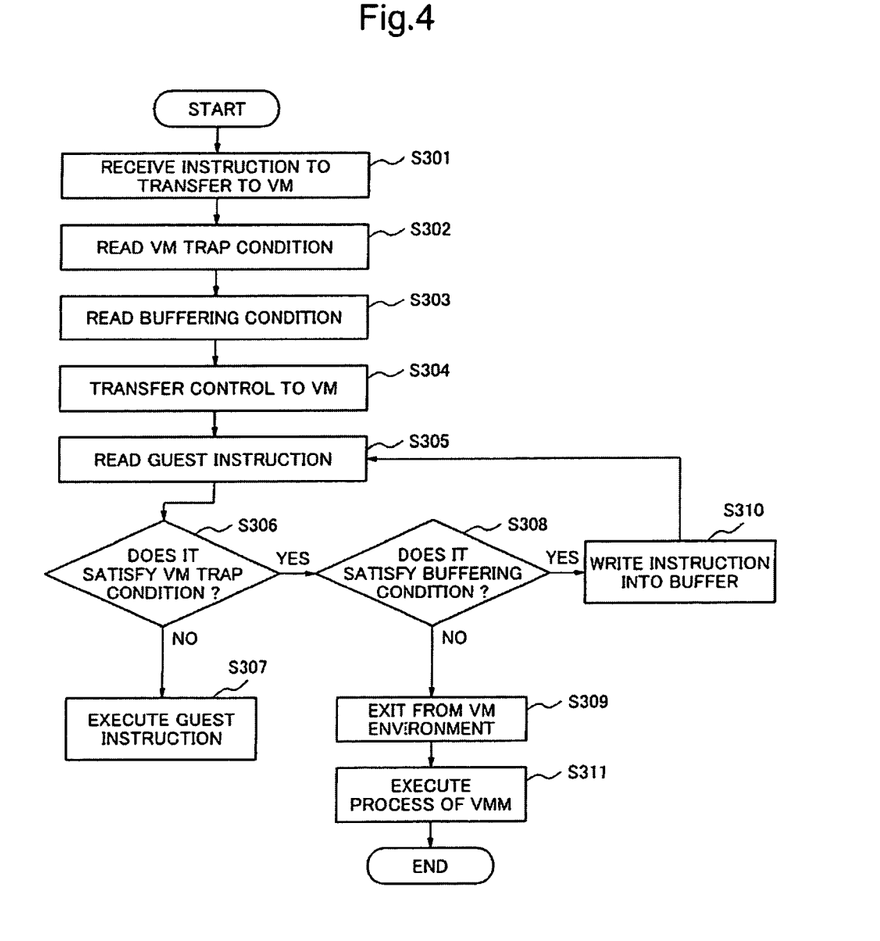
FIG. 4 is a flowchart showing an example of operation of a virtualization system having the platform hardware according to the second exemplary embodiment.

FIG. 4 is a flowchart showing an example of operation of a virtualization system having the platform hardware 110 according to the second exemplary embodiment mentioned above.

The processor 120 receives the instruction which transfers the control to the VM 150 from the VMM 140 (Step S301). The processor 120 reads out the VM trap condition 242 from the VM structure 131 of the memory 130 and writes it into the condition storage section 212 of the VM trap logic 122 (Step S302). The processor 120 reads out the buffering condition 251 and the buffer address 252 from the buffer structure 132 of the memory 130 and writes them into the condition storage section 222 of the buffering logic 123 (Step S303). The processor 120 changes a mode. The processor 120 transfers the control to the VM 150 (Step S304).

The processor 120 acquires the guest instruction after the control is transferred to the VM 150 (Step S305). The determination section 211 of the VM trap logic 122 determines whether or not the guest instruction satisfies the VM trap condition 242 held in the condition storage section 212 (Step 306).

When the guest instruction does not satisfy the VM trap condition 242 ("No" determination in Step S306), the instruction execution logic 121 of the processor 120 executes the instruction (Step S307).

On the other hand, when the guest instruction satisfies the VM trap condition 242 ("Yes" determination in Step S306), the determination section 221 of the buffering logic 123 determines whether or not the guest instruction satisfies the buffering condition 251 held in the condition storage section 222 (Step S308).

When the guest instruction does not satisfy the buffering condition 251 ("No" determination in Step S308), the VM exit process section 213 of the VM trap logic 122 exits from the VM environment after saving a current state of the VM (Step S309). After the exit from the VM environment, the control is transferred to the VMM 140 (Step S311). The VMM 140 reads the content of the instruction stored in the buffer and executes appropriate processes such as an emulation and a log storage process so that an operation can continue when the control is transferred to the guest VM 150 at next time.

On the other hand, when the guest instruction satisfies the buffering condition 251 ("Yes" determination in Step S308), the instruction storage process section 223 of the buffering logic 123 writes the guest instruction into the designated buffer 260 (Step S310). Specifically, the instruction storage process section 223 writes the guest instruction itself, the operand, the value of the register and the address accessed by the instruction, the reason of the error and the like into a predetermined area in the buffer 260.

After executing the guest instruction (Step S307) and writing the instruction into the buffer (Step S310), the processor 120 executes the read process (Step 305) of the guest instruction again and then executes the processes in the steps S306 to S311 mentioned above similarly.

As described above, in the second exemplary embodiment, the processor 120 decides either to execute an exit of the VM 150 or to buffer the instruction, before executing the exit of the VM 150. And, the processor 120 buffers the instruction if needed. Accordingly, because at least a part of instructions is buffered, number of times at which a control is transferred to the VMM 140 from the VM 150 can be reduced. Therefore, the processing overhead used for a process by which the control is transferred to the VMM 140 from the VM 150 can be reduced and a processing performance of a system can be improved.

Figure 5:
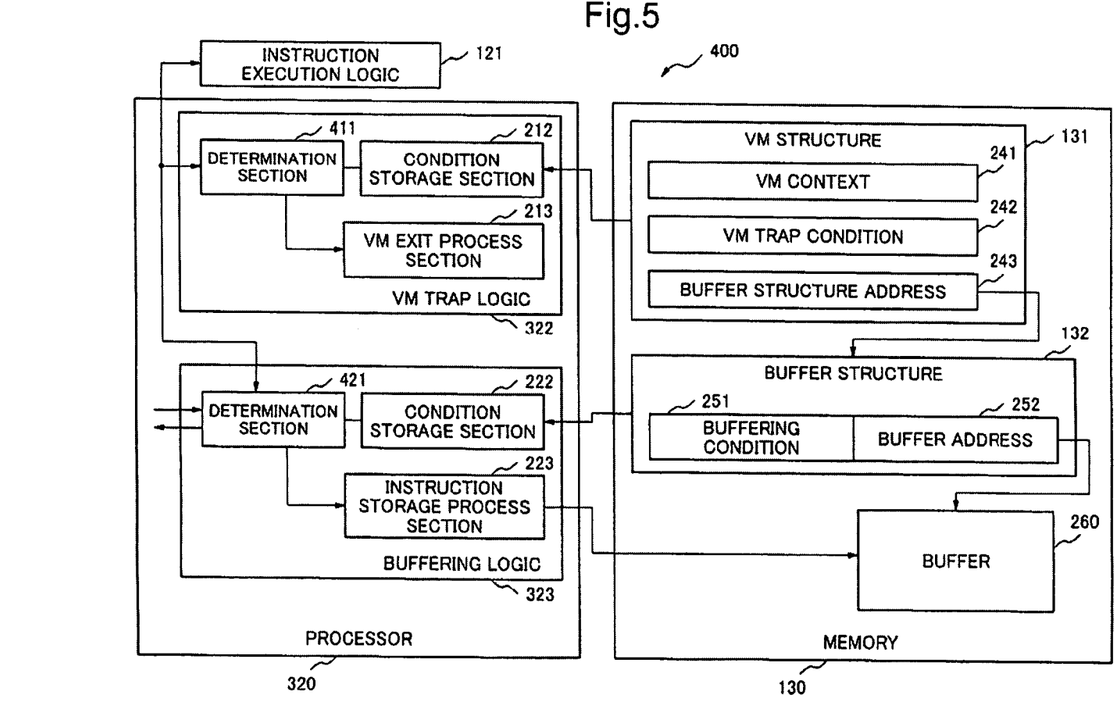
FIG. 5 is a detailed configuration diagram showing an example of a detailed configuration of a platform hardware according to a third exemplary embodiment of the present invention.

FIG. 5 is a detailed configuration diagram showing an example of a detailed configuration of a platform hardware 400 according to a third exemplary embodiment of the present invention. The platform hardware 110 according to the second exemplary embodiment includes the processor 120. On the other hand, the platform hardware 400 includes a processor 320 instead of the processor 120. This is a difference between two platform hardwares. The virtualization architecture on which the platform hardware 400 can operate is the same as the virtualization architecture shown in FIG. 2. The memory 130 that is a component other than the processor 320 in the platform hardware 400 is the same as the memory 130 of the second exemplary embodiment (refer to FIG. 3). Accordingly, the same numbers are used for the virtualization architecture and the memory shown in FIG. 5 and the description of these will be omitted.

The processor 320 includes the instruction execution logic 121, a VM trap logic 322 and a buffering logic 323. Here, the instruction execution logic 121 is the same as the instruction execution logic 121 shown in FIG. 3.

The VM trap logic 322 has a determination section 411. The determination section 211 shown in FIG. 3 determines only whether or not the "guest instruction" satisfies the trap condition. Meanwhile, the determination section 411 determines whether or not the "guest instruction which does not satisfy the buffering condition" or the "buffered guest instruction" satisfies the trap condition.

On the other hand, the buffering logic 323 has a determination section 421. The determination section 221 shown in FIG. 3 determines whether or not the "guest instruction which satisfies the VM trap condition" satisfies the buffering condition. Meanwhile, the determination section 421 determines only whether or not the "guest instruction" satisfies the buffering condition.

Namely, in the platform hardware 400 of the third exemplary embodiment, after the buffering determination is executed by the determination section 421 of the buffering logic 323, a determination process is executed by the determination section 411 of the VM trap logic 322.

Figure 6:
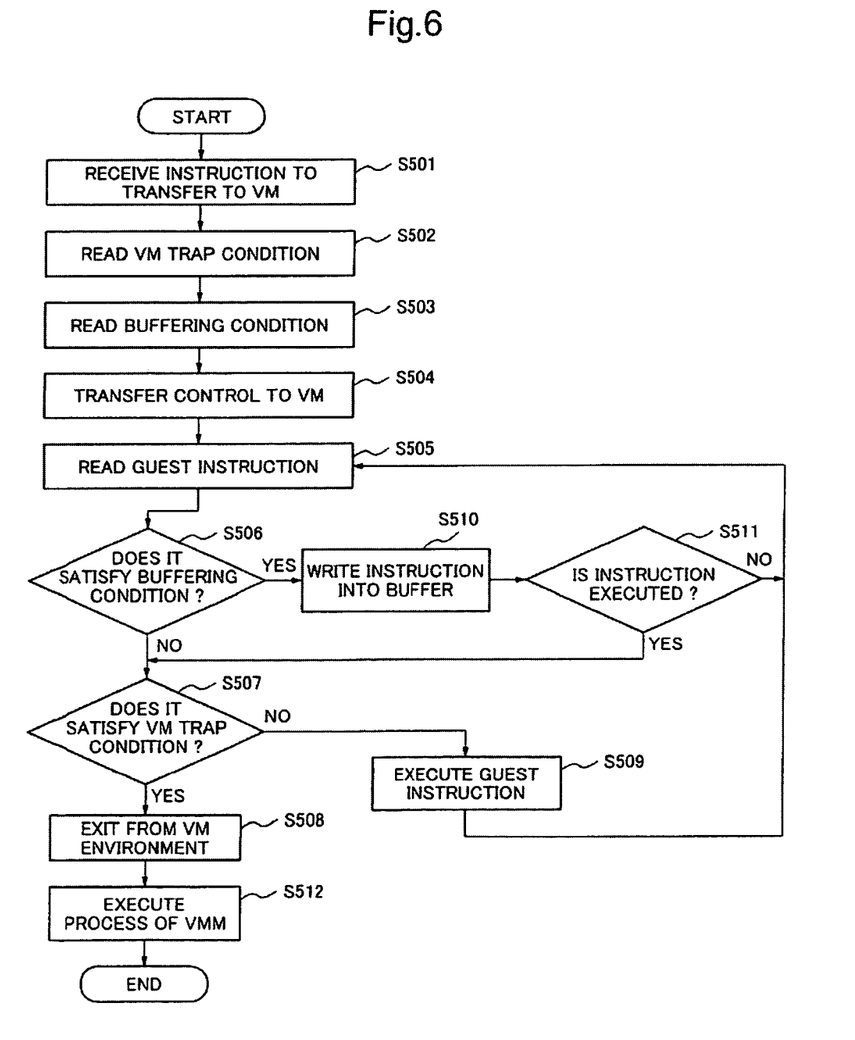
FIG. 6 is a flowchart showing an example of operation of a virtualization system having the platform hardware according to the third exemplary embodiment.

FIG. 6 is a flowchart showing an example of operation of a virtualization system having the platform hardware 400 according to the third exemplary embodiment mentioned above.

Because the operations of the processor in the steps S501 to S504 shown in FIG. 6 are the same as the operations of the processor in the steps S301 to S304 shown in a FIG. 4, the detailed description will be omitted.

After a control is transferred to the VM 150, the processor 320 acquires the guest instruction (Step S505) First, the determination section 421 of the buffering logic 323 determines whether or not the guest instruction satisfies the buffering condition 251 held in the condition storage section 222 (Step S506).

When the guest instruction does not satisfy the buffering condition 251 ("No" determination in Step S506), the determination section 411 of the VM trap logic 322 determines whether or not the guest instruction satisfies the VM trap condition 242 held in the condition storage section 212 (Step S507).

When the guest instruction satisfies the VM trap condition 242 ("Yes" determination in Step S507), the VM exit process section 213 of the VM trap logic 322 exits from the VM environment after saving a current state of the VM (Step S508). After the exit from the VM environment, the control is transferred to the VMM 140 (Step S512). The VMM 140 reads a content of the instruction stored in the buffer and executes appropriate processes such as an emulation and a log storage process so that an operation can continue when the control is transferred to the guest VM 150 at next time. At that time, the VMM 140 executes the process while determining whether or not the instruction stored in the buffer has been already executed.

When the guest instruction does not satisfy the VM trap condition 242 ("No" determination in Step S507), the instruction execution logic 121 of the processor 320 executes the instruction (Step S509).

On the other hand, when the guest instruction satisfies the buffering condition ("Yes" determination in Step S506), an instruction storage process section 223 of the buffering logic 323 writes the guest instruction into the designated buffer 260 (Step S510). Specifically, the instruction storage process section 223 writes the guest instruction itself, an operand, a value of the register and an address accessed by the instruction, a reason of an error and the like into a predetermined area in the buffer 260.

The determination section 421 of the buffering logic 323 determines whether or not to execute the instruction (Step S511). Further, a condition to determine whether or not to execute the instruction is described in the buffering condition 251 of the buffer structure 132 in advance.

When the instruction is executed ("Yes" determination in Step S511), the determination section 411 of the VM trap logic 322 determines whether or not the instruction to be executed satisfies the VM trap condition 242 (Step 507). When the instruction does not satisfy the VM trap condition 242 ("No" determination in Step S507), the instruction execution logic 121 of the processor 320 executes the guest instruction (Step 509).

When the instruction is not executed ("No" determination in Step S511), the processor 320 executes the read process (Step 505) of the guest instruction again and then executes the processes in the steps S506 to S512 mentioned above similarly.

As described above, in the third exemplary embodiment, the processor 320 decides either to execute an exit of the VM 150 or to buffer the instruction, before executing the exit of the VM 150. And, the processor 320 buffers the instruction if needed. Accordingly, because at least a part of instructions is buffered, number of times at which a control is transferred to the VMM 140 from the VM 150 can be reduced. Therefore, the processing overhead used for a process by which the control is transferred to the VMM 140 from the VM 150 can be reduced.

Additionally, in the third exemplary embodiment, it is determined whether or not the guest instruction satisfies the buffering condition prior to a determination of whether or not the guest instruction satisfies the VM trap condition. Therefore, it is possible to buffer a usual instruction with which a VM trap is not generated. By buffering the usual instruction, for example, a profiling to know what instruction is being executed becomes possible.

The first to the third exemplary embodiments described above can be applied to, for example, a processor such as a CPU and a computer system which has the processor and provides the VM environment.

A processor according to the fourth exemplary embodiment of the present invention includes a VM trap logic which acquires a guest instruction which is an instruction from a guest and performs a determination process of a trap and an exit process from a VM environment and a buffering logic which acquires the guest instruction and performs a determination process of a buffering and an instruction storage process.

A memory device according to the fifth exemplary embodiment of the present invention is a memory device provided in a processing device and stores a buffering condition to determine whether or not to buffer an instruction from a guest in a structure on the memory.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A method for processing an instruction from a virtual machine (VM) monitor for reducing control transfer between a VM environment and a VM monitor environment, comprising:
    acquiring the instruction from a guest within the VM environment through the VM monitor;
    determining whether to trap the instruction based on a predetermined trap condition;
    where the trap condition specifies not to trap the instruction, executing the instruction;
    where the trap condition specifies to trap the instruction, determining whether to buffer the instruction based on a predetermined buffering condition;
    where the buffer condition specifies to buffer the instruction, writing the instruction to a buffer within a memory device, and returning control to the guest without exiting the VM environment;
    where the buffer condition specifies to not buffer the instruction, transferring control to the VM monitor environment and exiting the VM environment such that the guest does not have control,
    wherein the trap condition specifies whether to execute the instruction or to trap the instruction within the VM environment,
    wherein the buffering condition specifies whether to buffer the instruction and not exit the VM environment, or to not buffer the instruction and exit the VM environment.

2. A method for processing an instruction from a virtual machine (VM) monitor for reducing control transfer between a VM environment and a VM monitor environment, comprising:
    acquiring the instruction from a guest within the VM environment through the VM monitor;
    determining whether to buffer the instruction based on a predetermined buffer condition;

where the buffer condition specifies to buffer the instruction, writing the instruction to a buffer within a memory device, and returning control to the guest without exiting the VM environment;
where the buffer condition specifies not to buffer the instruction, determining whether to trap the instruction based on a predetermined trap condition;
where the trap condition specifies not to trap the instruction, executing the instruction;
where the trap condition specifies to trap the instruction, transferring control to the VM monitor environment and exiting the VM environment such that the guest does not have control,
wherein the trap condition specifies whether to execute the instruction or to trap the instruction within the VM environment,
wherein the buffering condition specifies whether to buffer the instruction and not exit the VM environment, or to not buffer the instruction and exit the VM environment.

3. The method of claim 1, further comprising, responsive to determining to buffer the instruction:
determining whether to execute the instruction after writing the instruction to the buffer, based on a predetermined condition for the instruction;
where the predetermined condition specifies not to execute the instruction, returning control to the guest without exiting the VM environment;
where the predetermined condition specifies to execute the instruction, executing a process while determining whether the instruction written in the buffer has already been executed, after transferring control to the VM monitor environment.

4. The method of claim 1, wherein:
the buffer includes at least one of the instruction, an operand, values of a register, an address to be accessed in accordance with the instruction, and an error reason.

5. A processor comprising:
a virtual machine (VM) trap logic to acquire an instruction from a guest, to execute within a VM environment a determining process for a trap based on a trap condition to determine whether to execute the instruction or to trap the instruction, and to execute an exit process from the VM environment; and,
a buffering logic to acquire the instruction, to execute within a VM environment a determining process for buffering based on a buffering condition to determine whether to perform buffering to maintain the VM environment or to exit the VM environment, and to execute an instruction storing process for storing the instruction into a buffer arranged in a memory device where the buffering condition specifies that the instruction is to be buffered,
wherein the buffering logic is to evaluate the instruction, and where the instruction is to be buffered, the buffering logic executes a process to return to a waiting state for acquiring another instruction from the guest without exiting the VM environment,
and wherein the VM trap logic, where the exit process is executed, transfers control to a VM monitor environment such that the guest does not have control.

6. The processor of claim 5, wherein:
the buffering logic is to acquire the buffering condition from a data structure arranged in the memory device.

7. The processor of claim 5, wherein:
the buffering logic is to acquire an address of the buffer for buffering the instruction, from a data structure arranged in the memory device.

8. The processor of claim 5, wherein:
the buffering logic, where the buffering is performed, is to further determine whether to execute the instruction.

9. The processor of claim 5, wherein:
the instruction storing process is to store information including at least one of the instruction, an operand, values of a register, an address to be accessed in accordance with the instruction, and an error reason.

10. A processing device comprising:
a processor comprising:
a virtual machine (VM) trap logic to acquire an instruction from a guest, to execute within a VM environment a determining process for a trap based on a trap condition to determine whether to execute the instruction or to trap the instruction, and to execute an exit process from the VM environment;
a buffering logic to acquire the instruction, to execute within a VM environment a determining process for buffering based on a buffering condition to determine whether to perform buffering to maintain the VM environment or to exit the VM environment, and to execute an instruction storing process for storing the instruction into a buffer where the buffering condition specifies that the instruction is to be buffered; and,
a memory device to store the buffer and the buffering condition, the buffering condition being information that is used by the buffering logic and is read into a data structure upon the processor executing a process for reducing control transfer between the VM environment and a VM monitor environment,
wherein the buffering logic is to evaluate the instruction, and where the instruction is to be buffered, the buffering logic executes a process to return to a waiting state for acquiring another instruction from the guest without exiting the VM environment,
and wherein the VM trap logic, where the exit process is executed, transfers control to a VM monitor environment such that the guest does not have control.

11. The processing device of claim 10, wherein:
the buffering logic is to acquire an address of the buffer for buffering the instruction from the data structure, the data structure arranged in the memory device.

12. The processing device of claim 10, wherein:
the instruction storing process is to store information including at least one of the instruction, an operand, values of a register, an address to be accessed in accordance with the instruction, and an error reason.

13. A computer system comprising the processing device of claim 10, wherein the computer system is to provide the VM environment.

14. A computer system for providing a virtual machine (VM) environment in which a part of an instruction is buffered without transferring control to a VM monitor environment during execution of a guest, by using a processing device, the processing device comprising:
a processor comprising:
a virtual machine (VM) trap logic to acquire an instruction from a guest, to execute within a VM environment a determining process for a trap based on a trap condition to determine whether to execute the instruction or to trap the instruction, and to execute an exit process from the VM environment;
a buffering logic to acquire the instruction, to execute within a VM environment a determining process for buffering based on a buffering condition to determine whether to perform buffering to maintain the VM environment or to exit the VM environment, and to execute an instruction storing process for storing the instruction into a buffer where the buffering condition specifies that the instruction is to be buffered; and, a memory device to store the buffer and the buffering condition, the buffering condition being information that is used by the buffering logic and is read into a data structure upon the processor executing a process for reducing control transfer between the VM environment and a VM monitor environment, wherein the buffering logic is to evaluate the instruction, and where the instruction is to be buffered, the buffering logic executes is to execute a process to return to a waiting state for acquiring another instruction from the guest without exiting the VM environment, and wherein the VM trap logic, where the exit process is executed, transfers control to a VM monitor environment such that the guest does not have control.

* * * * *